April 19, 1927. 1,625,438
E. VOSBURGH
SORTING MACHINE
Filed May 6, 1925  5 Sheets-Sheet 2

INVENTOR
Edward Vosburgh
BY
ATTORNEY

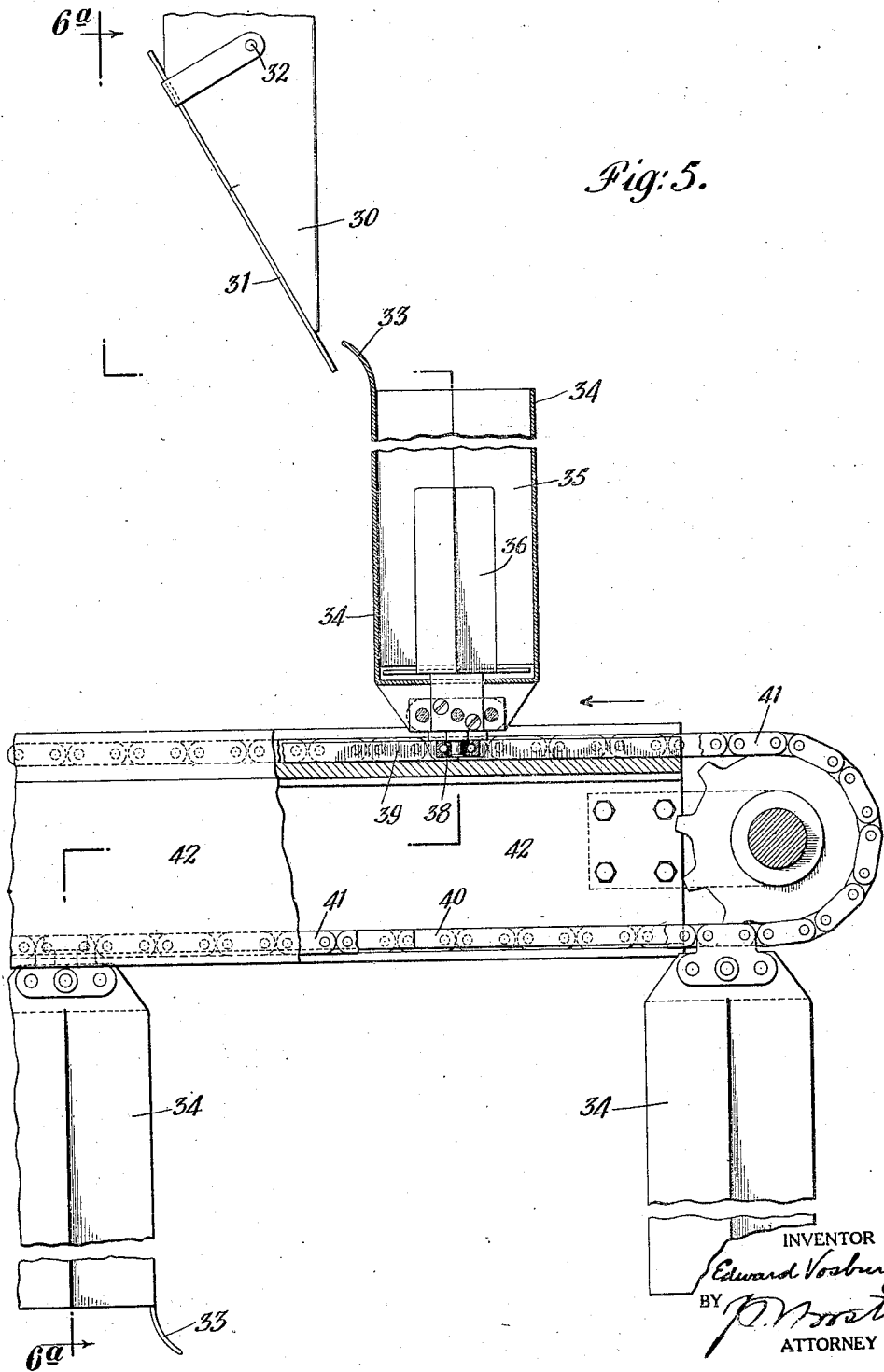

April 19, 1927.  E. VOSBURGH  1,625,438
SORTING MACHINE
Filed May 6, 1925   5 Sheets-Sheet 4
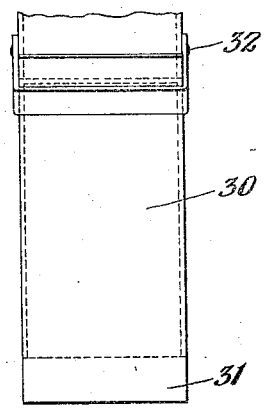
Fig. 6.
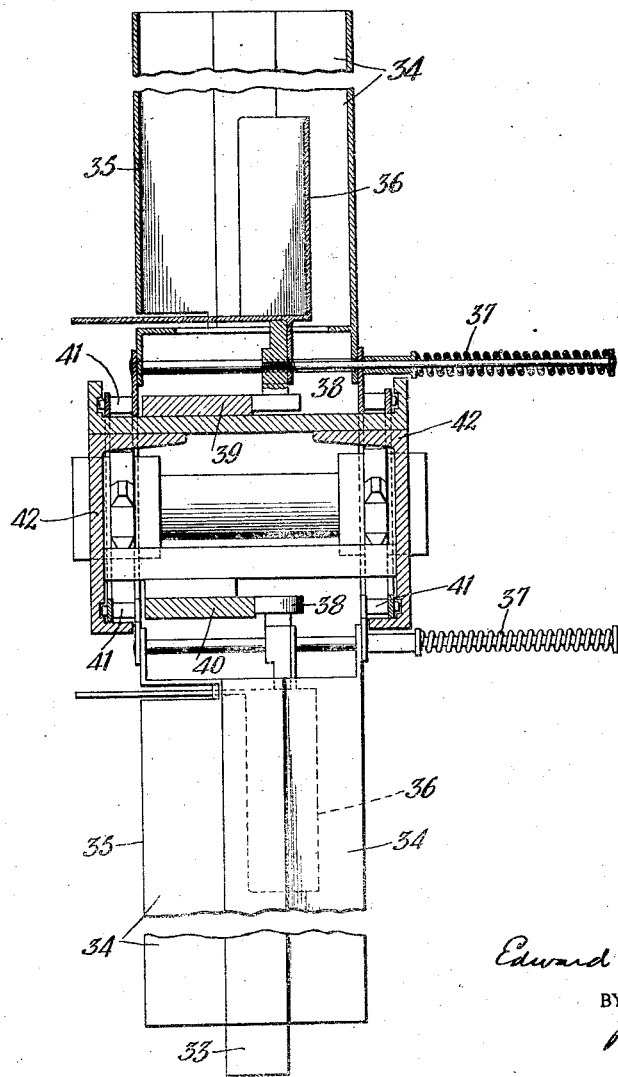
Edward Vosburgh INVENTOR
BY
ATTORNEY April 19, 1927.  E. VOSBURGH  1,625,438
SORTING MACHINE
Filed May 6, 1925   5 Sheets-Sheet 5

Fig. 7.

INVENTOR
Edward Vosburgh
BY
ATTORNEY

Patented Apr. 19, 1927.

1,625,438

UNITED STATES PATENT OFFICE.

EDWARD VOSBURGH, OF PASSAIC, NEW JERSEY.

SORTING MACHINE.

Application filed May 6, 1925. Serial No. 28,373.

This invention relates to machines for grading teasels and other articles and has for its object to accurately and quickly separate objects according to both length and diameter without danger of breaking or damaging them.

According to this invention, objects to be sorted according to length and diameter are fed to a conveyor with their corresponding axes all in the same direction, and automatically discharged from the conveyor into some one of several associated receiving means by mechanism responsive to one dimension of the object carried on the conveyor. A plurality of other conveyors associated with said first mentioned conveyor and said receiving means each automatically receive objects of a particular size from the first conveyor and further grade them by discharging them at a particular location according to the second dimension. In this manner, objects such as teasels are automatically graded as to length and diameter and sorted into corresponding bins, according to the number of sizes desired.

Referring to the drawings:

Fig. 5 is an end view of one of the several conveyors in the lower portion of the machine;

Fig. 6 is a section on the line 6ᵃ—6ᵃ of Fig. 5, and

Fig. 7 is a top plan of general arrangement of conveyors.

Figure 1:
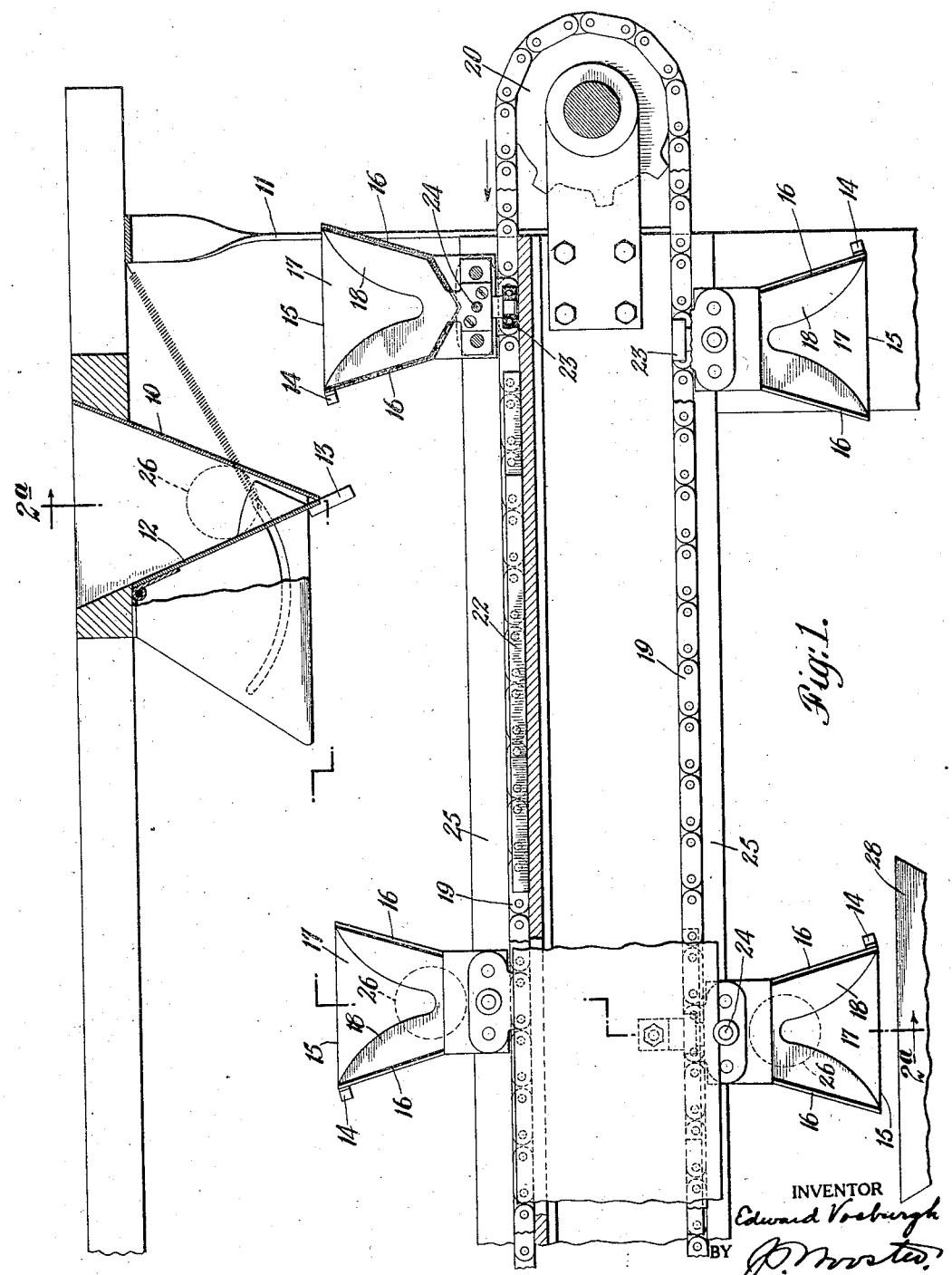
Figure 1 is a side view of the top portion of the machine.
Figure 2:
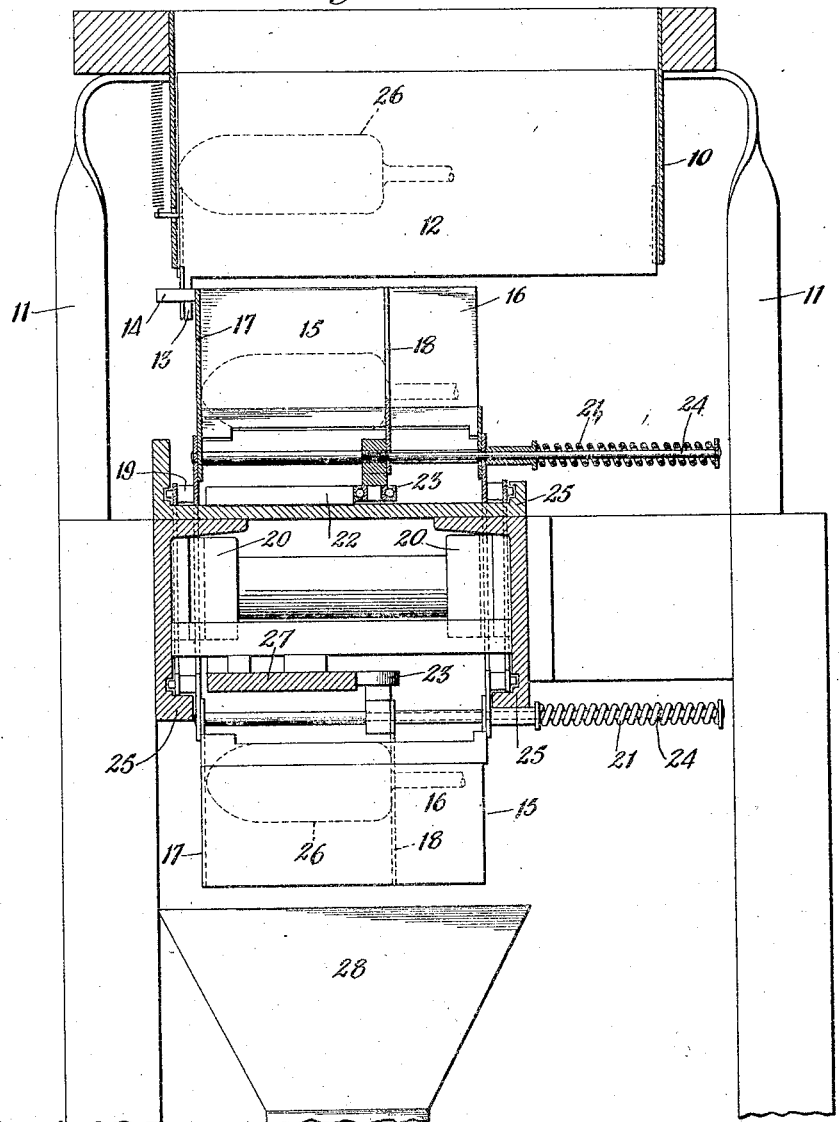
Fig. 2 is a section on the line 2ᵃ—2ᵃ of Fig. 1.
Figure 4:
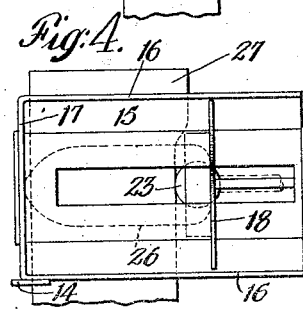
Fig. 4 is a bottom plan view of one of the same receptacles when inverted.
Figure 3:
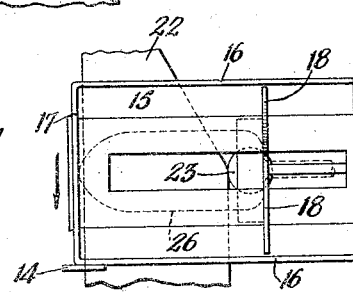
Fig. 3 is a top plan view of one of the receptacles.

The supply hopper 10 supported above the machine by the frame 11 is provided with a V-shaped bottom, one of the sides of which is pivoted as indicated to be opened and allow one of the teasels or other objects being sorted to fall into the receptacle 15. The hopper 10 is of sufficiently great width to cause the teasels to lie on their sides between the converging portions of the bottom of the hopper. A projection 13 on the movable side 12 of the hopper is adapted to be engaged by a projection 14 on the receptacle 15 in opening and a spring is used to close the side 12 after the receptacle 15, mounted on the endless conveyor 19, has passed from under the hopper. There are a number of receptacles 15 mounted on the conveyor 19 as indicated in Fig. 1, and each comprises inclined sides 16 and ends 17 and 18, the former of which is fixed and the latter movable, being pressed inwardly by the action of the spring 21. The spring 21 is a relatively light compression spring in order that a teasel, when clamped between the ends of the receptacle, acting as yieldable clamping jaws, may not be injured but is gripped firmly enough to prevent its falling out when the receptacle is inverted by passing over one of the wheels 20 over which the conveyor moves. The end 18 of the receptacle is provided with a V-shaped notch as indicated in Fig. 1 for the purpose of allowing the stem of a teasel to project through as shown in dotted lines in the lower part of Fig. 2 where the teasel is indicated by the numeral 26. In order to move the end 18 against the action of spring 21 for the purpose of receiving a teasel from the hopper 10, a cam 22 is provided of the general shape indicated in Fig. 3, and located to the right of the hopper in Fig. 1 between the guide rails or track of the support 25 so that a roller 23 attached to the end 18 is engaged by the cam and separates the clamping jaws or receptacle ends far enough to allow the longest size of teasel to be received by the receptacle. After passing hopper 10, the cam 22 is preferably oppositely tapered to allow the receptacle end 18 to gradually close upon the ends of the teasle, and hold it clamped endwise between the ends 17 and 18. The support 25 prevents sagging of either the upper or lower portions of the conveyor. Between the lower supporting rails is a second cam 27 having stepped portions arranged so that when one of these stepped portions shown in Fig. 4 is engaged by the roller 23 the receptacle end 18 will be released and the teasle 26 will fall into a hopper 28. There are a number of hoppers 28, 29, etc., beneath the conveyor and in the preferred embodiment the cam 27 is so shaped as to grade teasles into size lengths differing from one and another by a quarter of an inch, the first step portion of the cam 27 being located to release the receptacle end 18 when the length of teasel is from an inch to an inch and a quarter. The next size released are lengths from an inch and a quarter to an inch and a half. Length sizes differing a quarter of an inch are also separated up to two and one-half inches in length, then from two and one-half to three inches, and the last or largest size is for teasels over three inches in length. After the teasels have been released and discharged from the receptacles 15 they are carried over the wheel 20 by the conveyor and into position for again receiving another teasel, each receptacle holding only one teasel at a time.

The teasels already graded in length size and contained within the hoppers 28, 29, etc. are next graded in width or diameter, and for this purpose the ends 30 of each hopper are smaller in width and thickness than the length of the teasel so that due to the tapered sides of the hoppers 28, 29, etc., the teasel is positioned axially or endwise in the lower end 30. The bottom 31 is movable about the pivot 32 and has sufficient clearance to be opened by projection 33 on the receptacle 34 and allow the teasel to fall endwise into the receptacle 34 where it will be yieldably clamped with its sides between the jaws and sides 35 or 36, the former of which is fixed and the latter yieldably movable under the influence of the spring 37 in a manner substantially similar to the movement of receptacle end 18 previously described. A cam 39 actuates a roller 38 beneath the movable side 36 and separates the sides of the receptacle a maximum amount just before the receptacle passes beneath the hopper end 30. The cam 39 is preferably shaped to permit the clamping jaws 35 and 36 to gradually close or be moved together if a teasel of small diameter is received or if no teasel is dropped, as this will prevent damage to the teasel and needless vibration in the machine. There are a number of conveyors 41 each carrying a number of receptacles 34 and the travel of conveyors 41 is preferably at right angles to the travel of the conveyor 19 so that a conveyor 41 is beneath each of the hoppers 28, 29, etc., for the purpose of grading each size length of teasel according to its diameter. Beneath the support 42 of the conveyor 41 is another cam 40 stepped to engage roller 38 and move the side 36 an eighth of an inch as each bin (not shown) is passed over, whereby the teasels of a given length are sorted in diameter to sizes differing by an eighth of an inch, there being preferably at least four such bins for different diameters of each length size.

Among the advantages of this invention may be mentioned its ability to sort teasels and other objects according to more than one dimension, the machine illustrated being capable of grading teasels to both length and diameter, so that the purchaser may be sure of receiving teasels of the size ordered and best adapted for use in his machine. The use of clamping jaws for yieldably retaining a teasel within the receptacle enables articles of different size to be carried and dropped over the appropriate bin where its size is required. The teasels may be fed into the supply hopper 10 by hand or otherwise and the operation of the machine is automatic from the time the teasel is removed from the hopper 10 until dumped into the particular bin where articles of its length and diameter belong. The machine is rapid, being capable of handling many times the number of teasels that could be graded manually and by guess work. Since from about 100 to 125 teasels are the equivalent of a pound in weight, it will be seen that each article is relatively light so that the springs for controlling the clamping jaws of each receptacle need only be relatively light. If no teasel is received by a receptacle its clamping jaws come together gradually without jar and are opened gradually by the stepped cam beneath the conveyor when the receptacles are inverted and the operation and control of the yieldable jaws is automatic whether an object be contained in the receptacle or not. The speed of the conveyor 41 and the spacing of the receptacles 34 thereon is preferably so related to the speed of the conveyor 19 and the spacing of its receptacles 15 that a receptacle 34 passes under each hopper 28, 29, etc. each time a receptacle is passed over the top of hoppers 28, 29, etc. so that there will be no likelihood of two teasels falling into a single hopper 28, 29, etc., nor of two teasels falling into one receptacle 34.

While this machine is described particularly in its application for grading teasels, it will be understood that other objects are also adapted to be graded in both length and thickness by this machine and if other objects are handled the dimensions of the machine, its receptacles, cams, hoppers, etc. and their location, may need to be varied to suit the particular object graded. While the machine has been described in connection with the grading of objects according to only two dimensions, it will be understood that by carrying forward the idea and providing additional conveyors and receptacles below each of the bins into which the objects are finally placed by the machine illustrated, that articles can be graded according to their size in all three dimensions. The reason objects are graded according to only two dimensions in the embodiment of the invention illustrated is because teasels are of a generally cylindrical shape and therefore need sorting only as to length and diameter, the depth and thickness being the same as the diameter.

I claim:

1. In a sorting machine the combination with an endless conveyor, of supporting tracks therefor, clamping jaws on said conveyor, said jaws comprising fixed and movable jaw members, means tending to close each pair of jaws, a projection on each movable jaw member extending to adjacent said supporting tracks, and means carried on said tracks for cooperation with said projections for opening said jaws in receiving, and for releasing said jaws in discharging, an object at the desired point of travel of the conveyor.

2. In a sorting machine the combination with yieldable means for individually clamping and conveying objects to places for graded discharge, of means for releasing said clamping means and discharging objects from said conveyor at locations according to the size of the object between said clamping means, means for separately feeding objects discharged from the first conveyor to some one of a plurality of second conveyors, means on each of said second conveyors for yieldably clamping objects along another dimension from that by which they were clamped in the first conveyor, and means for releasing said objects from said second conveyors according to the size of said other dimension.

3. In a sorting machine, an endless conveyor having receptacles thereon for the articles to be graded, means for discharging said articles from said conveyor at spaced points in the conveyor travel according to one dimension of the articles, a plurality of second conveyors, means for supplying articles to the second conveyors from the first, and means for discharging said articles at spaced points in the travel of said second conveyors according to a second dimension of said articles.

4. In a sorting machine, a grading conveyor adapted to deliver articles into a plurality of fixed hoppers, an endless conveyor associated with each of said hoppers, a receptacle on each of said endless conveyors, means on said receptacles for causing one of said hoppers to discharge into said receptacle, and gaging means associated with said receptacle.

5. In a sorting machine, a grading conveyor adapted to deliver articles to a plurality of fixed hoppers, an endless conveyor associated with each of said hoppers, a receptacle carried by each of said conveyors, means on said receptacle for causing one of said hoppers to discharge into said receptacle, means in said receptacle for clamping the sides of cylindrical articles to be sorted, and means for releasing said clamping means when the receptacle has moved to the lower run of the conveyor, said last mentioned means being responsive to the diameter of said articles.

6. A sorting machine comprising an endless conveyor, a receptacle carried thereby and adapted to receive and position the articles to be sorted, clamping means in said receptacle, a plurality of similar conveyors associated with said first mentioned conveyor, means for releasing said clamping means while the receptacle is moving along the lower run of said first mentioned conveyor, said releasing means being responsive to the length of said articles, and grading means associated with each of said second mentioned conveyors for separating the articles according to another dimension.

7. In a sorting machine, the combination with an endless conveyor, of a supporting track therefor, a pair of clamping jaws carried by said conveyor, a spring adapted to urge one of said jaws toward the other, a roller associated with one of the jaws and extending to adjacent said supporting track, and cams carried by said track and cooperating with said roller for opening the jaws in receiving, and for releasing the jaws in discharging, an article at the desired point of travel of the conveyor.

8. A sorting machine for cylindrical articles, comprising an endless conveyor, clamping means carried by said conveyor, means for causing said clamping means to engage the ends of said articles, means for releasing said clamping means while the same is moving along the lower run of the conveyor, said releasing means being responsive to the length of the article, and means for further grading the article according to diameter after it is released by the clamping means, said last mentioned means comprising a plurality of hoppers positioned to receive the articles released from said clamping means, and an endless conveyor positioned adjacent each of said hoppers.

Signed at New York in the county of New York and State of New York this 5th day of May A. D. 1925.

EDWARD VOSBURGH.